United States Patent [19]

Schempp

[11] 4,076,223
[45] Feb. 28, 1978

[54] ENCLOSURE FOR STEEL CONVERTING APPARATUS

[75] Inventor: Eberhard G. Schempp, Pittsburgh, Pa.

[73] Assignee: Pennsylvania Engineering Corporation, Pittsburgh, Pa.

[21] Appl. No.: 645,536

[22] Filed: Dec. 31, 1975

[51] Int. Cl.² ............................................. C21B 7/22
[52] U.S. Cl. .............................................. 266/158
[58] Field of Search ............ 98/115 R; 266/144, 158; 75/60

[56] References Cited

U.S. PATENT DOCUMENTS

| 2,855,194 | 10/1958 | König | 266/158 |
|---|---|---|---|
| 3,743,264 | 7/1973 | Baum et al. | 266/158 |
| 3,799,520 | 3/1974 | Hegemann et al. | 266/158 |
| 3,814,402 | 6/1974 | Moubon | 266/158 X |
| 3,854,709 | 12/1974 | Gaw | 266/158 |
| 3,955,803 | 5/1976 | Baum et al. | 266/158 |

FOREIGN PATENT DOCUMENTS

| 732,543 | 4/1966 | Canada | 266/158 |
|---|---|---|---|
| 76,548 | 7/1961 | France | 266/158 |
| 1,590,185 | 6/1970 | France | 266/158 |

*Primary Examiner*—Roy Lake
*Assistant Examiner*—Paul A. Bell

[57] ABSTRACT

An open-topped vessel for converting molten ferrous metal to steel is pivotal about a horizontal axis and has bottom tuyeres for blowing oxygen or other gases upwardly through molten metal. An enclosure at least partially surrounds the vessel and has a top opening to permit a primary smoke hood to prevent the escape of pollutants when the vessel is in its vertical position. An auxiliary hood is disposed above an access door and is provided in the enclosure laterally of the vessel tilt axis. An elevatable auxiliary smoke hood is disposed in surrounding relation to the smoke hood for sealing the top opening.

9 Claims, 5 Drawing Figures

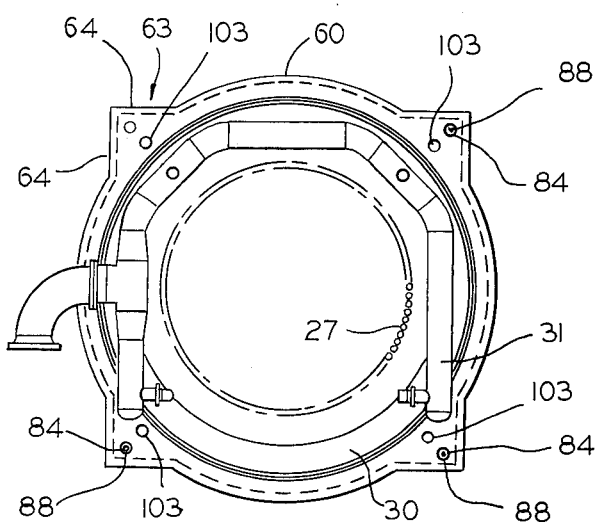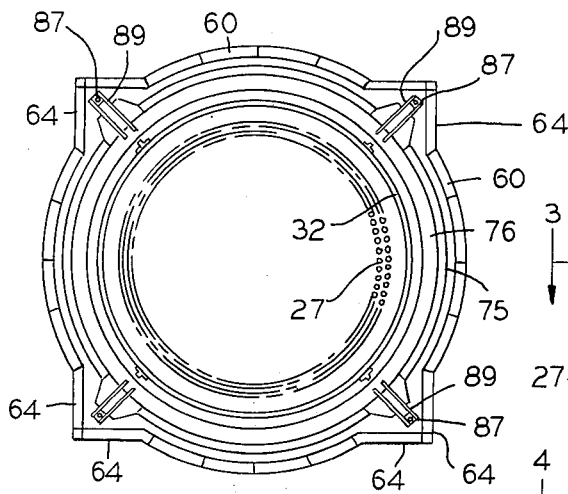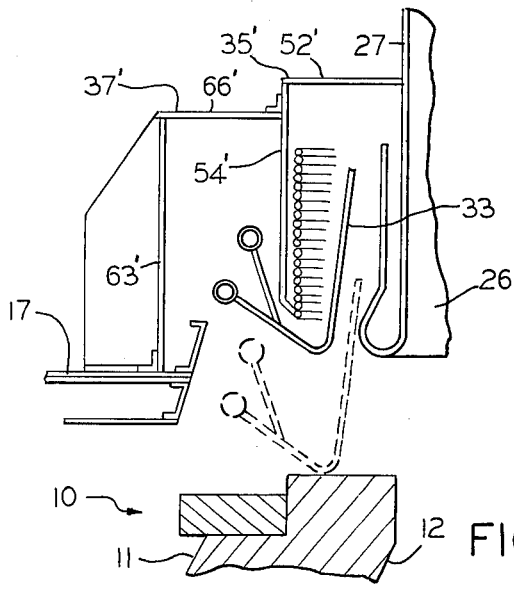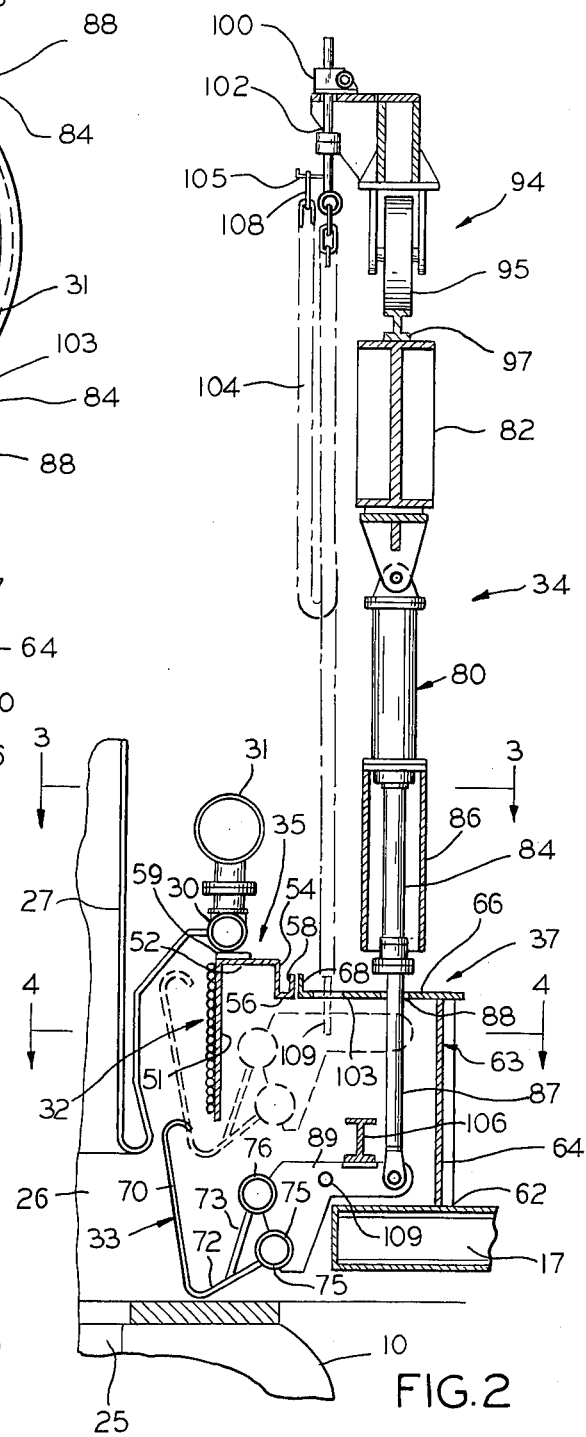

ENCLOSURE FOR STEEL CONVERTING APPARATUS

BACKGROUND OF THE INVENTION

This invention relates to enclosures for steel conversion apparatus.

The pneumatic type of steel conversion apparatus generally includes an open-topped vessel into which oxygen is injected by a lance or tuyers extending through the vessel's refractory lining. When submerged tuyerses are used, a hydrocarbon shielding fluid, such as light oil, natural gas or propane, may be injected in surrounding relation to the oxygen for prolonging tuyere life. As a result of the reactions which occur during pneumatic steel making processes, pollutant gases and particulate material are discharged from the open upper end of the vessel. In order to prevent the discharge of these pollutants, such vessels are often provided with a smoke hood coupled to a gas cleaning system and having a skirt movable into and out of close proximity to the charge receiving opening in the upper end of the vessel. During a normal process cycle, the skirt is elevated to permit the vessel to be pivoted for charging, sampling, pouring and deslagging. Also the skirt is normally separated from the vessel during the beginning and end portions of the cycle. Accordingly, an enclosure may be provided around the vessel for preventing discharge of pollutants during such charging operations. An access door in one side of the enclosure may be opened and closed for periodic charging. Prior art enclosures were provided with an opening which permitted the movable skirt to reciprocate. This was not wholly satisfactory, however, because pollutants tended to discharge through this opening when the skirt was elevated.

SUMMARY OF THE INVENTION

A general object of the invention is to provide apparatus for preventing the discharge of pollutants from steel conversion vessels when the latter are in each of various alternate positions.

A further object of the invention is to provide a new improved enclosure for steel converter enclosures.

These and other objects and advantages of the present invention will become more apparent from the detailed description thereof taken with the accompanying drawings.

BRIEF DESCRIPTION OF THE DRAWINGS

FIG. 2 is an enlarged view of a portion of the enclosure shown in FIG. 1;

FIG. 3 is a view taken along lines 3—3 of FIG. 2;

FIG. 4 is a view taken along lines 5—5 of FIG. 2; and

FIG. 5 is an enlarged fragmentary view, partly in section, of an alternate embodiment of the present invention.

DESCRIPTION OF THE PREFERRED EMBODIMENTS

Figure 1:
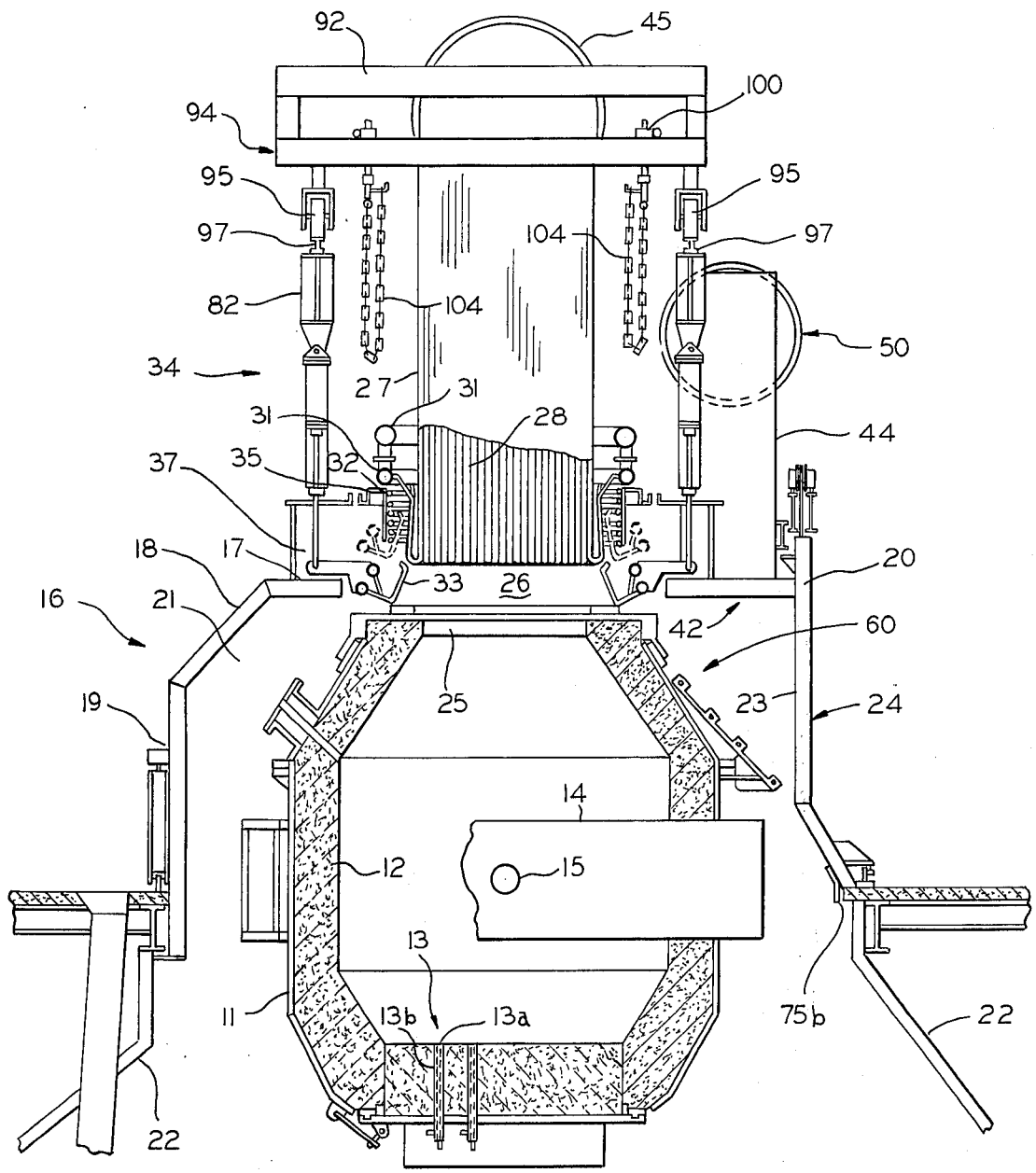
FIG. 1 is a front elevational view, partly in section, of a converter vessel enclosure according to one embodiment of the invention.

The invention will be illustrated and discussed with respect to a bottom blown converter vessel 10 shown in the drawing although those skilled in the art will appreciate that it has application to other types of converter vessels as well, such as basic oxygen and argon-oxygen systems.

The vessel 10 has an opening 25 at its upper end and includes a metallic shell 11 and refractory lining 12. A plurality of tuyeres 13 extends through the lower end of the vessel and includes an inner tuyere pipe 13a and an outer tuyere pipe 13b to permit the injection of oxygen and a hydrocarbon shielding fluid as will be discussed more fully below. Converter vessels of the type illustrated are generally supported in a conventional manner on a trunnion ring 14 which has a trunnion pin 15 extending from each of its opposite sides. The trunnion pins 15 are suitably supported in a well-known manner on conventional bearing structures (not shown) and are coupled to a suitable drive mechanism (not shown) for tilting the vessel to each of a plurality of positions as may be required during a process cycle.

The vessel 10 is shown in FIG. 1 to be disposed within a metallic enclosure 16 having a top wall 17 disposed above the upper end of the vessel and an inclined back wall portion 18 extending downwardly and outwardly from the top wall 17 and to the upper end of a vertical back wall portion 19. In addition, the enclosure 16 includes a front wall 20 and generally vertical end walls 21. Skirt portions 22 extend downwardly and outwardly from the lower ends of the back and front walls 19 and 20. A generally rectangular opening 23 is formed in front wall 20 and to one side of and generally parallel to the axis of the trunnion pins 15. A closure door assembly 24 is mounted for movement into and out of a closed position relative to the opening 23.

An opening 26 is formed in top wall 17 for receiving a smoke hood 27 which is preferably water cooled and may be formed of a plurality of individual, longitudinally extending pipes 28 each connected at one end to a manifold pipe 30 which in turn is connected to a supply pipe 31. The passage of smoke hood 27 through opening 26 is preferably also water cooled by means of a helical pipe or pipes 32 which are also connected to inlet and outlet manifold pipes (not shown). A movable skirt 33 is disposed in surrounding relation to the lower end of the hood 27 and is movable by positioning apparatus (not shown in FIGS. 1 and 2) between positions shown by full and broken lines in FIGS. 1 and 2.

An auxiliary enclosure includes a first annular housing 35 surrounding pipe 32 and a second generally annular housing 37 mounted on top wall 17 in surrounding relation to housing 35.

A second opening 42 is formed in cover 17 at a point above the access opening 23 for receiving the lower end of an auxiliary smoke hood 44. The primary smoke hood 27 is coupled by a conduit 45 to a gas cleaning system (not shown) which may, for example, include a quencher and a gas scrubber. The quencher (not shown) and the gas scrubber (not shown) may be of the variable throat venturi type of wet scrubbers which are well known in the art and which function to remove particulates and lower the off-gas temperature. In addition, means such as a fan (not shown) is coupled to the scrubber for creating a suction under the hood 26 and within the enclosure 16. For a more complete description of the gas cleaning apparatus which may be connected to the smoke hood 26, reference is made to copending application, Ser. No. 340,302, filed Mar. 12, 1973 and assigned to the assignee of the present invention. The auxiliary smoke hood is connected by a second conduit 50 and a valve (not shown) into the gas cleaning system between the quencher and gas scrubber.

The coil 32 may be formed of individual tubes which are connected in a side-by-side fashion to form a gas impervious cylindrical wall which is suspended from housing 35 by bracket 51. An annular top wall 52 is affixed to and extends outwardly from the upper end of coil 32. At the outer end of wall 52, a second coaxial vertical wall 54 extends downwardly and terminates at its lower end in a horizontal flange 56 which extends outwardly and has an annular, vertically extending portion 58 defining its outer periphery. An annular ring 59 is affixed to top wall 52 and the manifold pipe 30.

Housing 37 is disposed in coaxial surrounding relation to housing 35 and includes an outer, generally vertical wall 60. A flange 62 extends outwardly from the lower end of wall 60 for resting on the top wall 17 of enclosure 16 and around opening 26. Wall 60 is generally cylindrical except for portions 63 arranged at approximately 90° intervals around its periphery and each of which is defined by a pair of vertical wall segments 64 which intersect each other at approximately right angles as seen in FIGS. 2 and 3. Housing 37 also includes an upper wall 66 having an outer periphery which is affixed to and conforms generally with the wall portion 60. Wall 66 extends inwardly from wall 60 and terminates at its inner edge in a flange 68 which is generally parallel to and closely spaced with respect to flange 58.

The skirt 33 is composed of a plurality of tubular members which are formed with a reverse hair pin bend to provide a pair of closely spaced, side-by-side leg portions 72 and 73 which are respectively connected to surrounding manifold pipes 75 and 76, one of which comprises an inlet and the other an outlet. It will be appreciated that a plurality of tubes 70 are affixed in a side-by-side relation by intervening bar members (not shown) and in an annular configuration to define the skirt 33.

The skirt lift mechanism 34 includes four hydraulic cylinders 80 supported below and extending downwardly from a pair of parallel support beams 82 which extend along the opposite sides of the hood 27 and for a substantial distance. One cylinder 80 is disposed above each of the housing portions 63 and each has a piston rod 84 extending downwardly and through a shroud 86. Coupled to the lower end of rod 84 is a connecting rod 87 which in turn extends through an aligned small opening 88 in housing 37 and is connected at its lower end to a bracket 89 affixed to the manifold pipes 75 and 76. The cylinder 80 is double acting so that pressurization in a first direction will elevate the skirt 33 from its position shown by full lines in FIG. 2 wherein it is adjacent the upper end of vessel 10 to an elevated position shown by broken lines. Conversely, pressurization of the cylinder 80 in the opposite direction will move skirt 33 from its elevated position shown by broken lines to its position shown by full lines in FIG. 2.

Those skilled in the art will appreciate that the skirt 33 is made elevatable so that it will not interfere with rotation of the vessel 10 for purposes of charging, sampling, deslagging or pouring. In addition, the movable skirt 33 permits the control of air into the gas cleaning hood 27 during various portions of the process cycle. For example, during one steel making method employing the vessel 10, the skirt 33 is in its elevated position during the commencement of an oxygen blow. This permits a sufficient indraft of air to cause stochiometric conditions to exist with respect to the combustible off-gases such as hydrogen and carbon monoxide passing outwardly from the vessel 10 and into the hood 17. After stochiometric conditions have been reached, the skirt 33 is lowered so that the flow of air into the hood 27 is minimized and the combustible off-gases may thereafter be safely collected.

The hood 27 and the conduit 45 are affixed to a frame 92 forming a part of a car 94. The wheels 95 of car 94 engage rails 97 supported on the beams 82. In this manner, the hood 27 and conduit 45 may be moved laterally away from the vessel 10 to permit maintenance procedures.

Also supported from car 94 are a plurality of screw jacks 100, one of which is disposed above the sections 63 of housing 60. The screw jacks may be motor operated and have a generally vertically oriented adjustable threaded shaft 102 which is in axial alignment above an opening 103 in the upper wall 66 of housing 37. One end of a chain 104 is affixed to the lower end of rod 102 and its free end is normally suspended from a hook 105 affixed to rod 102 so that the chain 104 does not extend to the housing 37.

It will be recalled that the skirt 33 is moved between its position shown by full and phantom lines in FIG. 4 by the cylinder 80. Normally, the housing 37 is not affected by this movement and remains in its position shown by full lines. When it is desired to move the hood 27, a short spacer beam 106 is affixed to each of the brackets 89 so that when the skirt 33 is elevated by cylinders 80, the spacer beams 106 will engage the undersurface of the top wall 66 of housing 32 so that the same is also elevated from its position shown by full lines to its position shown by broken lines. The free ends of the chains 94 are then removed from the hooks 105 and are extended downwardly through the openings 103 in top wall 66. The screw jacks 100 will be adjusted such that the ring 108 on the lower end of chain 104 will reside in alignment with openings 109 in each of the bracket plates 89 so that the brackets 89 may be secured to chains 104 by inserting a pin (not shown) through the aligned openings 109 in brackets 89 and the rings 108. After the brackets 89 have been secured to the chain 104, the rod 87 may be uncoupled from the piston shaft 84 and from the bracket 109 so that the brackets 89 are no longer connected to the cylinders 80. In this manner, the housings 35 and 37, the coil 32 and the skirt 33 may all be moved with the hood 27 when the car 94 is moved laterally. The pistons 80, however, remain in position and accordingly, their hydraulic lines (not shown) need not be disconnected. It will be appreciated also, that when the hood 27, the coil 32, the skirt 33, and the housings 35 and 37 are returned to their normal operative positions, the bracket plates 89 are again recoupled to the piston 80 and disconnected from the chain 104 in a reverse procedure from that discussed above.

During the normal vessel operation and particularly when the skirt 33 is in its position elevated shown by broken lines, the housings 35 and 37 substantially seal the opening 26 in the enclosure 16. Accordingly, the escape of pollutant gases around the lower edge of the hood 27 during furnace operation is substantially minimized.

The alternate embodiment of the auxiliary enclosure is shown in FIG. 5 to also include first and second annular housing portions 35' and 37'. The housing portion 35' is shown in FIG. 5 to be generally annular and to include an annular top wall 52' engaging the hood 27 at its inner end and extending outwardly therefrom. At the outer end of wall 52' a first, coaxial, vertical wall 54' extends downwardly in surrounding relation to coil 32 and generally coaxially with hood 27. The housing 37' includes a top wall 66' extending outwardly from wall 54' and a vertical wall 63' whose lower end rests on the primary enclosure top wall 17 in surrounding relation to opening 26. The skirt elevating mechanism is not shown in FIG. 5 but extends through top wall 66'.

While only a single embodiment of the invention has been shown and described, it is not intended to be limited thereby but only by the scope of the appended claims.

I claim:

1. A converter vessel having a metal receiving opening formed adjacent an upper end and means for delivering an oxidizing gas to said vessel,
   a primary enclosure having an upper wall portion disposed above said vessel and side wall portions extending downwardly along the sides of said vessel, a vent opening formed in the upper wall portion of said primary enclosure and generally above the metal receiving opening of said vessel,
   a smoke hood having an inlet adjacent said vent opening and extending upwardly from said inlet,
   a movable skirt disposed in surrounding relation to said hood inlet and movable into and out of close proximity with said metal receiving opening,
   an auxiliary enclosure surrounding said vent opening and including a first portion having a first generally outwardly directed wall means having an inner edge disposed in closely surrounding relation to said hood and a second wall means extending generally vertically and spaced from said hood,
   said auxiliary enclosure also including a second portion having a third wall means extending generally outwardly from said first portion and a fourth wall means extending generally vertically and spaced from said second wall means, the lower end of said fourth wall means engaging said primary enclosure in surrounding relation to said vent opening,
   means extending through said auxiliary enclosure for moving said skirt vertically within said enclosure and relative to said metal receiving opening,
   the second wall portion extending in general parallelism with that portion of said hood adjacent said inlet and being spaced therefrom to define an annular gap therebetween, said skirt being movable into and out of said gap upon vertical movement relative to said metal receiving opening,
   said first auxiliary enclosure portion being attached to said hood, said second auxiliary enclosure portion being detached from said first portion and being disposed in closely surrounding relation thereto, engaging means associated with said skirt for engaging said second auxiliary enclosure portion when said skirt is elevated for elevating said second portion away from said primary enclosure,
   translating means supporting said hood for movement laterally of said enclosure, supporting means on said translating means for releasably engaging said skirt when the latter is elevated for supporting said skirt and the second portion of said auxiliary enclosure,
   said elevating means being releasably connected to said skirt and fixedly mounted relative to said translating means whereby said elevating means may be disconnected from said skirt and supported by said supporting means for lateral movement along with said translating means.

2. The apparatus set forth in claim 1 wherein said skirt comprises a plurality of hollow tubular elements, manifold pipe means affixed to said tubular elements and movable therewith for providing cooling water thereto, said manifold pipe means being disposed on the opposite side of the wall portion defining said gap when said skirt is within said gap, and cooling coil means disposed within said gap and in surrounding relation to said skirt, said cooling coil means being mounted on said auxiliary enclosure independently of said skirt.

3. The apparatus set forth in claim 1 wherein said elevating means includes hydraulic cylinder means releasably engageable with said skirt said supporting means comprising chain means suspended from said translating means.

4. A converter vessel having a metal receiving opening formed adjacent an upper end and means for delivering an oxidizing gas to said vessel,
   a primary enclosure having an upper wall portion disposed above said vessel and side wall portions extending downwardly along the sides of said vessel, a vent opening formed in the upper wall portion of said primary enclosure and generally above the metal receiving opening of said vessel,
   a smoke hood having an inlet adjacent said vent opening and extending upwardly from said inlet,
   a movable skirt disposed in surrounding relation to said hood inlet and movable into and out of close proximity with said metal receiving opening,
   an auxiliary enclosure surrounding said vent opening and including a first portion mounted on said hood and having a first generally outwardly directed wall means having an inner edge disposed in closely surrounding relation to said hood and a second wall means extending generally vertically and spaced from said hood,
   said auxiliary enclosure also including a second portion detached from said first portion and normally being disposed in closely surrounding relation thereto, said second portion having a third wall means extending generally outwardly from said first portion and a fourth wall means extending generally vertically and spaced from said second wall means, the lower end of said fourth wall means engaging said primary enclosure in surrounding relation to said vent opening,
   and means extending through said auxiliary enclosure for moving said skirt within said auxiliary enclosure and relative to said metal receiving opening, said second auxiliary enclosure portion being movable relative to said first portion, engaging means associated with said skirt means for engaging said second auxiliary enclosure portion when said skirt means is elevated for elevating said second portion away from said primary enclosure, translating means supporting said hood for movement laterally of said enclosure, supporting means on said translating means for releasably engaging said skirt when the latter is elevated for supporting said skirt and a second portion of said auxiliary enclosure, said elevating means being releasably connected to said skirt and fixedly mounted relative to said translating means whereby said elevating means may be disconnected from said skirt and supported by said supporting means for lateral movement along with said translating means.

5. A converter vessel having a metal receiving opening formed adjacent an upper end and means for delivering an oxidizing gas to said vessel,
   a primary enclosure having an upper wall portion disposed above said vessel and side wall portions extending downwardly along the sides of said vessel, a vent opening formed in the upper wall portion of said primary enclosure and generally above the metal receiving opening of said vessel,
   a smoke hood having an inlet adjacent said vent opening and extending upwardly from said inlet,
   a movable skirt disposed in surrounding relation to said hood inlet and movable into and out of close proximity with said metal receiving opening,
   an auxiliary enclosure having a first portion surrounding the inlet of said smoke hood and said skirt and a second portion surrounding said first portion and having a lower edge engaging said upper wall portion in surrounding relation to said vent opening,
   means for elevating and lowering said skirt within said auxiliary enclosure, said second auxiliary enclosure portion being movable relative to said first portion,
   engaging means associated with said skirt for engaging said second auxiliary enclosure portion when said skirt means is elevated for elevating said second portion away from said primary enclosure,
   translating means supporting said hood for movement laterally of said enclosure,
   supporting means on said translating means for releasably engaging said skirt when the latter is elevated for supporting said skirt and the second portion of said auxiliary enclosure, said elevating means being releasably connected to said skirt and fixedly mounted relative to said translating means whereby said elevating means may be disconnected from said skirt and supported by said support means for lateral movement along with said translating means.

6. The apparatus set forth in claim 5 wherein the first portion of said auxiliary enclosure includes a wall portion extending in general parallelism with that portion of said hood adjacent said inlet and being spaced therefrom to define a gap therebetween, said skirt being movable into and out of said gap.

7. The apparatus set forth in claim 6 wherein said skirt comprises a plurality of hollow tubular elements, manifold pipe means affixed to said tubular elements and movable therewith for providing cooling water thereto, said manifold pipe means being disposed on the opposite side of the wall portion defining said gap when said skirt is within said gap, and cooling coil means disposed within said gap and in surrounding relation to said skirt and between said hood and said wall portion.

8. The apparatus set forth in claim 7 wherein said first auxiliary enclosure portion is mounted on said hood and has an outer periphery and said second enclosure portion is detached from said first enclosure portion and has an inner periphery disposed in closely spaced relation to said outer periphery, and first and second flange means respectively formed on said inner and outer peripheries and being disposed in closely spaced relation and extending in the direction of movement of said second auxiliary enclosure portion.

9. The apparatus set forth in claim 8 wherein said cooling coil is mounted on said wall portion independently of said skirt.

* * * * *